(12) United States Patent
Lockhart

(10) Patent No.: US 6,236,835 B1
(45) Date of Patent: May 22, 2001

(54) METHOD FOR ACQUIRING A PREDETERMINED TYPE OF INFORMATION FROM A SELECTIVE CALL DEVICE IN A COMMUNICATION SYSTEM

(75) Inventor: Thomas Wayne Lockhart, Vancouver (CA)

(73) Assignee: Motorola, Schaumburg, IL (US)

( * ) Notice: Subject to any disclaimer, the term of this patent is extended or adjusted under 35 U.S.C. 154(b) by 0 days.

(21) Appl. No.: 09/216,766

(22) Filed: Dec. 21, 1998

(51) Int. Cl.[7] .................................................. H04Q 7/00
(52) U.S. Cl. ........................ 455/31.1; 455/38.1; 455/38.3; 340/825.44
(58) Field of Search ................................ 455/38.1, 38.2, 455/38.3, 38.4, 38.5, 343, 517, 524, 550, 31.1; 340/825.44

(56) References Cited

U.S. PATENT DOCUMENTS

| 5,444,438 | 8/1995 | Goldberg et al. . |
| 5,678,191 | 10/1997 | Eaton et al. . |
| 5,940,757 | * 8/1999 | Callaway, Jr. ....................... 455/38.1 |
| 5,956,621 | * 9/1999 | Weiss et al. .......................... 455/38.3 |

* cited by examiner

Primary Examiner—Reinhard J. Eisenzopf
Assistant Examiner—Sam Bhattacharya
(74) Attorney, Agent, or Firm—James A. Lamb

(57) ABSTRACT

A technique is used in an infrastructure (150) of a two-way radio synchronous communication system (100) to efficiently acquire a predetermined type of information from a selective call device (106). The technique includes receiving an inquiry (1), generating a response schedule, generating a response command message (3), transmitting the response command message, receiving a demand response (4), and accepting the demand response as an acknowledgment to the response command message. The inquiry includes a device latency needed for the selective call device to generate the predetermined type of information and includes a response length. The response schedule is determined from the device latency and the response length. The response command message includes a special command and the response schedule. The demand response includes the predetermined type of information, and is transmitted in accordance with the response schedule. The demand response is accepted as an acknowledgment to the response command message.

13 Claims, 6 Drawing Sheets

METHOD FOR ACQUIRING A PREDETERMINED TYPE OF INFORMATION FROM A SELECTIVE CALL DEVICE IN A COMMUNICATION SYSTEM

RELATED APPLICATIONS

Application Ser. No. 09/097764, filed Jun. 16, 1998 by Ohel, entitled "METHOD FOR COORDINATING INBOUND CHANNELS IN A SELECTIVE CALL COMMUNICATION SYSTEM."

FIELD OF THE INVENTION

This invention relates in general to selective call communication systems and in particular to a method for efficiently acquiring information from a selective call device.

BACKGROUND OF THE INVENTION

Known techniques of transmitting and receiving inbound messages in a multichannel communication system from a plurality of selective call devices on a plurality of inbound channels include a technique of using a scheduled inbound transmission protocol and a technique of using a contention (unscheduled) inbound transmission protocol. An example of a scheduled inbound transmission protocol is a transmission protocol in which at least one predetermined periodic time slot is reserved on at least one predetermined inbound channel for each selective call device which is active in the selective call communication system. Another example of a scheduled inbound transmission protocol is a transmission protocol in which a selective call device is notified of a response time slot to be used for transmitting a long inbound message. The notification is given within an outbound message, which is sent in response to a short inbound message sent by the selective call device informing the communication system of the existence of the long inbound message.

An example of a contention inbound transmission protocol is an ALOHA protocol, which is well known to one of ordinary skill in the art. Inbound messages sent by an ALOHA protocol are typically transmitted as soon as they are generated. When two such messages happen to be transmitted on one channel such that some portions are transmitted simultaneously, one or both messages may not be received correctly. In this event, the messages are not acknowledged by the selective call communication system and each selective call device repeats the message after a random delay.

The communication system may be a wireline or optical or radio communication system. In a wireline system, the inbound channels may be separated by physically different wires, or may be separated (particularly in the case of high-speed wireline systems) by band limited channels, or by both. In optical or radio communication systems, the channels are typically separated by band-limited channels, but may alternatively or additionally be separated by time or code division duplexing.

Some systems that have an outbound signaling protocol that is synchronous are designed so that the selective call devices acquire synchronization to the outbound signaling protocol and use a scheduled inbound transmission protocol, because a scheduled inbound transmission protocol is typically more efficient than a contention inbound transmission protocol for several types of inbound messages, such as demand responses and acknowledgments. However, a contention transmission protocol can typically be more efficient for other types of inbound messages, such as some unsolicited inbound messages. Thus, it can be desirable to provide for both types of inbound transmission protocols.

Prior art systems typically provide for a mix of scheduled and contention inbound transmission protocols by designating some types of messages to be transmitted using an ALOHA protocol and other types of messages to be transmitted using a scheduled transmission protocol. A selective call device then uses the indicated technique on an authorized inbound channel. The authorized inbound channel is typically any one of the inbound channels that the selective call device is designed to use.

In the prior art systems, the selective call device must seek permission and wait an unspecified length of time before it can be granted a channel to send in its response. This method involves several transmissions and retransmissions between the selective call device, the radio frequency controller, and a home terminal before approval can be communicated to the selective call device.

Thus, what is needed is a technique for reducing the number of transmissions and the latency time currently being experienced when a selective call device has a demand response to an outbound message.

DETAILED DESCRIPTION OF THE INVENTION

Figure 1:
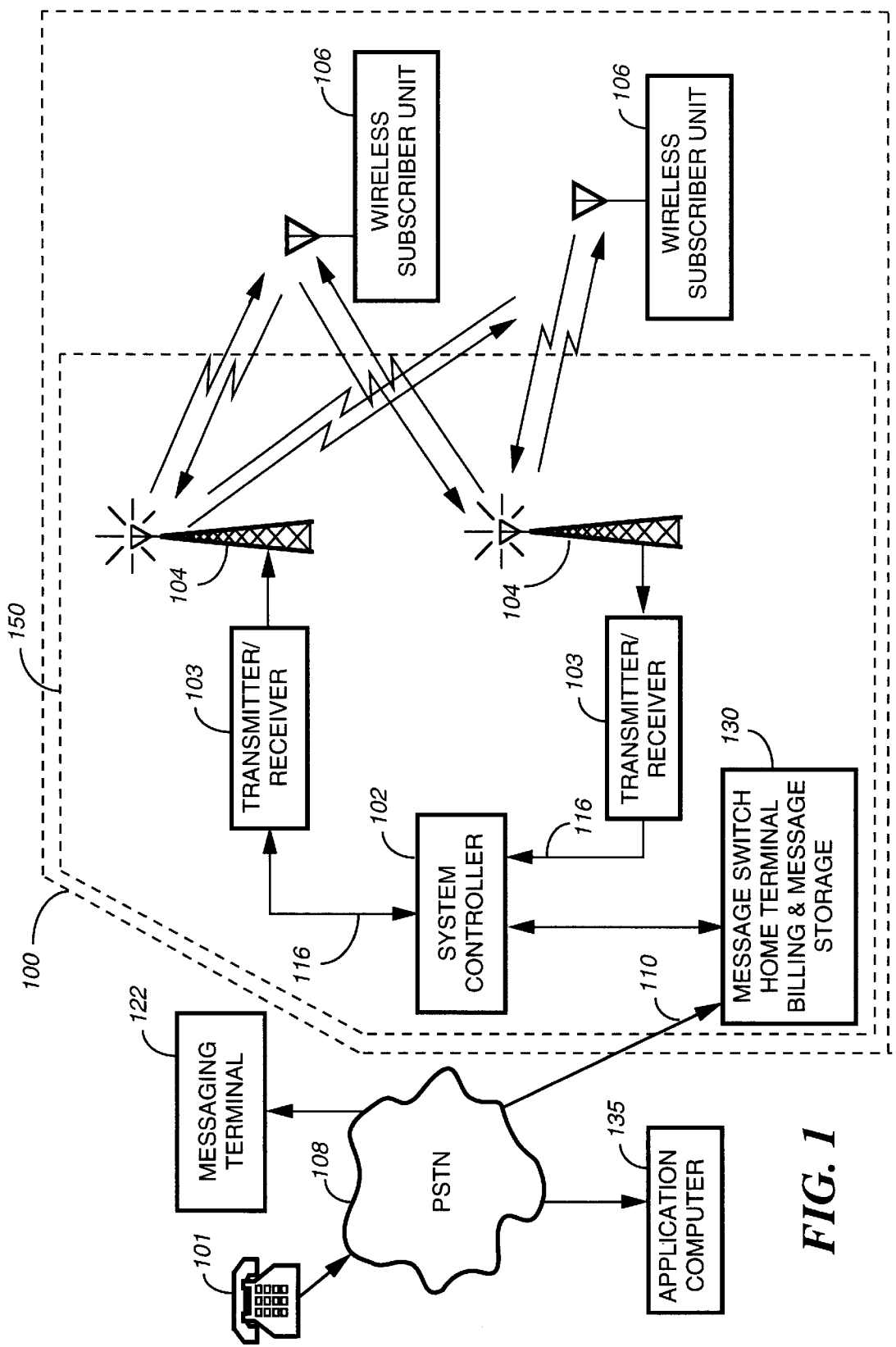
FIG. 1 is an electrical block diagram of a selective call communication system, in accordance with the preferred embodiment of the present invention.

Referring to FIG. 1, an electrical block diagram of a selective call radio communication system 100 (hereafter called simply the communication system 100) and external devices is shown in accordance with the preferred embodiment of the present invention. The communication system 100 comprises a messaging switch home terminal 130 (hereafter called simply the home terminal 130), a system controller 102, radio frequency (RF) transmitter/receivers 103, antennas 104, and a plurality of selective call devices 106. The system controller 102 oversees the operation of the plurality of radio RF transmitter/receivers 103, through one or more communication links 116, which typically are twisted pair telephone wires, and additionally can include RF, microwave, or other high quality audio communication links. External messaging devices are coupled to the home terminal 130 through a conventional public switched telephone network (PSTN) 108 by conventional telephone links 110. The external devices include an application computer 135 and such devices as a conventional telephone 101 and a messaging terminal 122. The system controller 102 encodes and decodes inbound and outbound telephone addresses into formats that are compatible with landline message switch computers. The system controller 102 also functions to encode and schedule outbound messages, which can include such information as analog voice messages, digital alphanumeric messages, and response command messages, for transmission by the radio frequency (RF) transmitter/receivers 103 to a plurality of selective call devices 106. The selective call devices 106, also described as wireless subscriber units, are preferably two-way communication devices capable of inbound message transmission, and are also referred to as acknowledge-back (ACKBACK) devices. The system controller 102 further functions to decode inbound messages, including unsolicited, acknowledgment, and demand response messages received by the radio frequency transmitter/receivers 103 from the plurality of selective call devices 106. According to the preferred embodiment, at least some of these selective call devices 106 are special purpose versions of the devices, e.g., meter reading, fire, status, security devices, etc. which are typically positioned at fixed locations to communicate status or values to the system controller 102, the home terminal, and/or the application computer 135 when requested. Hereafter, references to a selective call device or devices 106 is to one or more of the special purpose versions of the devices. The application computer 135 sends inquiry messages to the home terminal through the PSTN 108, in order to cause one or more of the selective call devices 106 to perform a function such as measuring, reading or acquiring at least one predetermined parameter and to return the measured, acquired or read value to the system controller 102, and thence through the home terminal to the application computer 135. A portion of the communication system 100 comprising the home terminal 130, the system controller 102, the links 116, the transmitter/receivers 103, and the antennas 104 is called the radio communication system infrastructure 150, or simply infrastructure 150.

An example of an outbound alphanumeric message that is intended for a selective call device 106 is an alphanumeric page message that is entered from the messaging terminal 122. An example of an outbound analog message that is intended for a selective call device 106 is a voice page message that is entered from the telephone 101. Examples of inbound messages are acknowledgments, demand responses, and unsolicited inbound messages. An acknowledgment is an inbound message transmitted by a selective call device 106 that indicates successful reception of an outbound message. A demand response is a message sent from a selective call device 106 in response to a response command included in an outbound message (otherwise herein referred to as a response command message) from the system controller 102. An example of a demand response message is a data message initiated by the selective call device 106, but which is not transmitted until after a response command message is received from the system controller 102. In accordance with the preferred embodiment of the present invention, such response command messages are sent by the system controller 102 after an inquiry message is received by the home terminal from the application computer 135. A demand response is transmitted by a selective call device 106 at a time scheduled by the system controller 102 (by which is meant during a predetermined number of time slots on a designated inbound channel) that is designated within an outbound demand response message. An unsolicited message is an inbound message transmitted by a selective call device 106 without having received a response command. An example of an unsolicited message is an inbound message from a selective call device 106 which alerts the communication system 100 that the selective call device 106 has been powered up. Unsolicited messages are transmitted using the slotted ALOHA protocol. The inbound and outbound messages are included in outbound radio signals transmitted from, and inbound radio signals received by, a conventional antenna 104 coupled to the radio frequency transmitter/receiver 103. It will be appreciated that in prior art communication systems, demand response messages are initiated typically only in response to unsolicited messages that are transmitted by selective call devices 106.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network. Moreover, as one of ordinary skill in the art would recognize, the telephonic and selective call device communication system functions can reside in separate system controllers 102 that operate either independently or in a network fashion.

Each of the selective call devices 106 assigned for use in the communication system 100 has at least one address assigned thereto which is a unique selective call address. The selective call address enables the transmission of a message from the system controller 102 only to the addressed selective call device 106. Each selective call address is correlated to a landline address used by the application computer 135 and the message switch home terminal to identify a selective call device 106 in messages communicated from the infrastructure 150 through the PSTN 108 (or directly, in some instances) to devices that communicate with the selective call devices 106 through the infrastructure 150.

Figure 2:
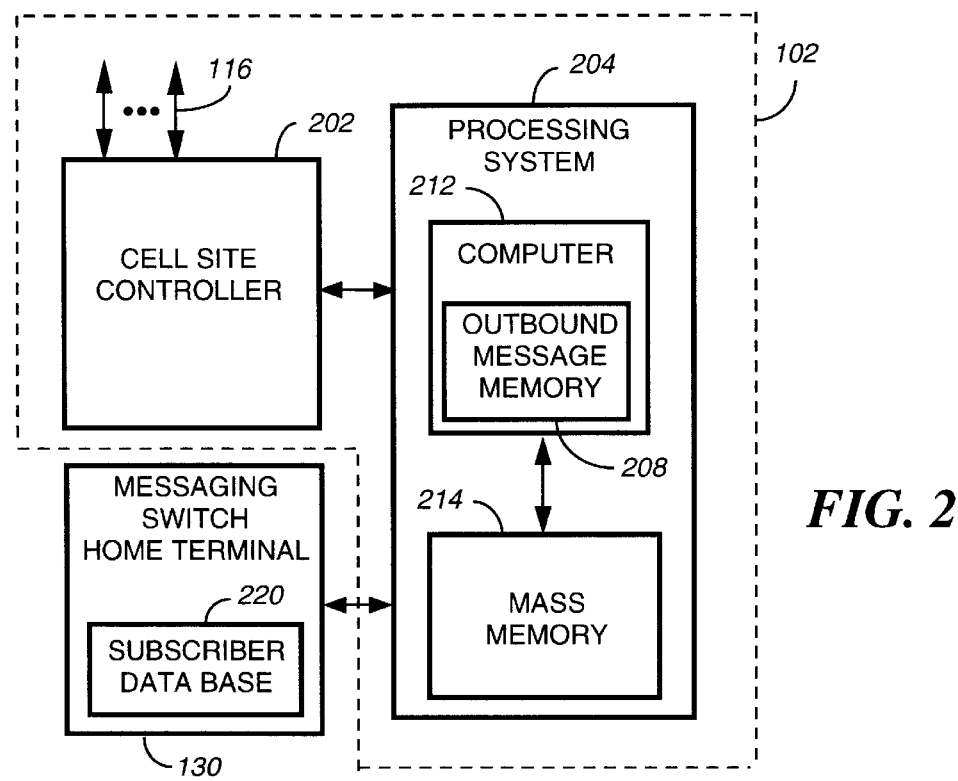
FIG. 2 is an electrical block diagram of the system controller according to FIG. 1.

A list of the selective call addresses is stored preferably in the home terminal 130 in the form of a subscriber data base 220 (FIG. 2). The home terminal 130 is coupled to the system controller 102. The subscriber data base 220 stores all the financial and billing information and the correlation of the landline addresses to the selective call addresses relating to the plurality of selective call devices 106 that subscribe to the communication system 100. When the home terminal receives an inquiry message from the application computer 135 or other message generating device, the home terminal ensures that the requesting selective call device 106 is a valid subscribing unit within the communication system 100. When the system controller 102 receives an inbound message from a selective call device 106 the system controller 102 establishes communication with the home terminal 130 to ensure that the requesting selective call device 106 is a valid subscribing unit within the communication system 100. The home terminal 130 also stores outbound messages until the outbound messages are delivered.

Referring to FIG. 2, an electrical block diagram of the system controller 102 is shown in accordance with the preferred embodiment of the present invention. The system controller 102 queues data and stored voice messages for transmission to the selective call devices 106, and receives acknowledgments, demand responses, unsolicited inbound data and stored audio messages.

The system controller 102 comprises a cell site controller 202, a processing system 204, and an outbound message memory 208. The cell site controller 202 is coupled to the radio frequency transmitter/receivers 103 (FIG. 1) by the links 116. The cell site controller 202 transmits outbound messages which include selective call addresses to the transmitter/receivers 103 and controls the transmitter/receivers 103 to transmit radio transmission cycles which include the outbound messages, using one or more outbound channels as scheduled by a message handler function. The cell site controller 202 also processes inbound messages from the selective call devices 106. The inbound messages are received by the transmitter/receivers 103 on a set of inbound radio channels, and are coupled to the cell site controller 202. The processing system 204, which includes the message handler function for routing and processing messages, is coupled to the cell site controller 202, the subscriber data base 220, and the outbound message memory 208.

The home terminal 130 is coupled to the processing system 204 which coordinates inbound messages from the selective call device 106. In the home terminal 130, the subscriber data base 220 stores information for each subscriber that includes correlation information described above, as well as other subscriber determined preferences, such as hours during which messages are to be held back from delivery to the selective call device 106. The outbound message memory 208 of the processing system 204 is for storing a queue of messages which are queued for delivery to at least one of the plurality of selective call devices 106, wherein each message of the queue of messages is associated with a selective call address, also stored in the outbound message memory 208 of one of the plurality of selective call devices 106 for which each message is intended.

Analog messages are converted to digital form by the processing system 204, prior to being stored in the outbound message memory 208. The message handler function schedules outbound messages and the selective call addresses associated therewith for transmission within a transmission cycle, by scheduling, as necessary, portions of outbound messages within frames of a transmission cycle. The message handler function also schedules those inbound message that are scheduled inbound messages (acknowledgements and demand response messages), identifying and assigning time slots of a transmission cycle for transmission of the scheduled responses. As described above, outbound messages may have either digital information, such as an alphanumeric message, or analog information, such as voice. A digital portion of a cycle which, in accordance with the preferred embodiment of the present invention is one or more control frames, is prepared for transmission by the message handler function, which determines from the subscriber data base 220 in the home terminal 130 the selective call addresses of selective call devices associated with both numeric and analog messages which are included in the cycle.

The message handler function of the system controller 102 identifies inbound messages as being associated with one of the selective call devices 106 in the subscriber data base 220 and identifies acknowledgments or demand responses as being associated with one of the outbound messages in the outbound message memory 208. As one example of cooperation between the home terminal 130 and the system controller 102, the delivery of an outbound message stored in the outbound message memory 208 is completed when: the outbound message has been communicated to the intended selective call device 106 and the outbound message has been acknowledged by the selective call device 106 or when a demand response has been received from the selective call device when the outbound message is a response command message. In the latter case, the message handler function generates another message that is sent to the home terminal 130 to notify the home terminal 130 that the response command message has been responded to by the selective call device 106.

The application computer is a conventional computer, such as a PC™ compatible computer. System controller 102 is preferably similar to an RF-Conductor!™ (RF-C!) radio frequency controller paging terminal, and the home terminal 130 is preferably similar to a WMG-Administrator!™, both manufactured by Motorola, Inc., of Schaumburg, Ill. The processing system 204 and home terminal 130 each preferably include a conventional computer system 212 and conventional mass storage media 214. The conventional computer system 212 preferably comprises a plurality of processors such as VME Sparc processors. These processors include memory such as dynamic random access memory (DRAM), which serves as a temporary memory storage device for scratch pad processing of such information as the outbound messages stored in the outbound message memory 208, inbound messages received from the selective call devices 106, and messages destined for the selective call devices 106 in the system controller 102, and for temporary storage of outbound and demand responses in the home terminal 130. The conventional mass storage media 214 is preferably a conventional hard disk mass storage device.

It will be appreciated that other types of conventional computer systems and components can be utilized for the home terminal 130 and the system controller 102, and that computer systems and components of the same or alternate type can be added as required to handle the processing requirements of the processing system 204 or home terminal 130.

The functions performed by the processing system 204 and messaging terminal 130, such as the message handler functions described above, are modified versions of conventional functions. The modified versions of the functions are executed by the conventional computer system components. The modified versions of the functions are controlled by a unique set of program codes generated using conventional programming tools.

The transmitter/receivers 103 and the antennas 104 are conventional infrastructure components. The transmitter/receivers 103 are preferably Nucleus®-Orchestra! transmitters and RF-Audience™ receivers, respectively, both manufactured by Motorola.

The communication system 100 of the present invention preferably utilizes the synchronous frame structure of the well known ReFLEX™ protocol (a high speed two-way paging protocol licensed by Motorola, Inc. of Schaumburg, Ill.) on the inbound and outbound channel for addressing and messaging. The control frames are preferably used for control, addressing, and delivery of digital messages to selective call devices 106. Frames are identical in length to standard FLEX™ frame and both types of frames begin with the standard FLEX™ synchronization. The frames are time multiplexed on each outbound channel.

Figure 3:
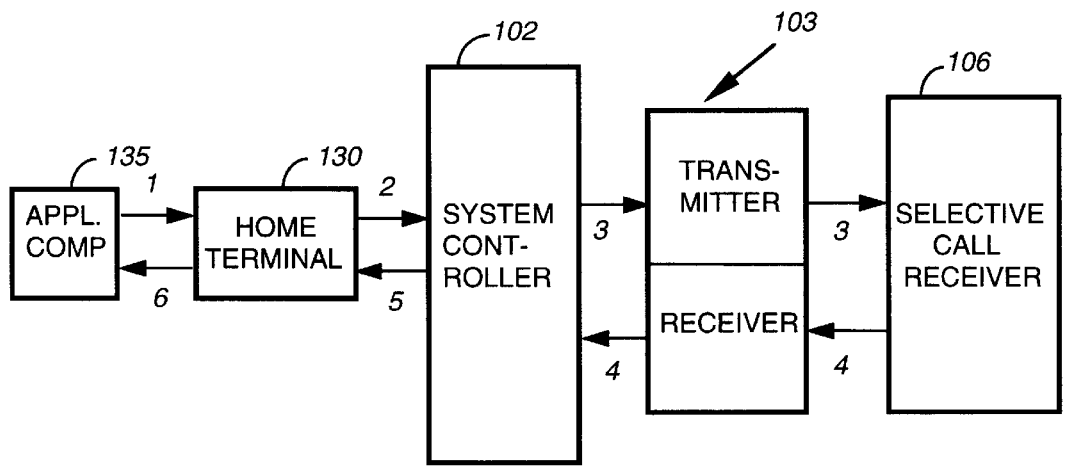
FIG. 3 is a block diagram illustrating the communication flow between the application computer, the messaging switch home terminal, the system controller, and the selective call device according to FIG. 1.
Figure 4:
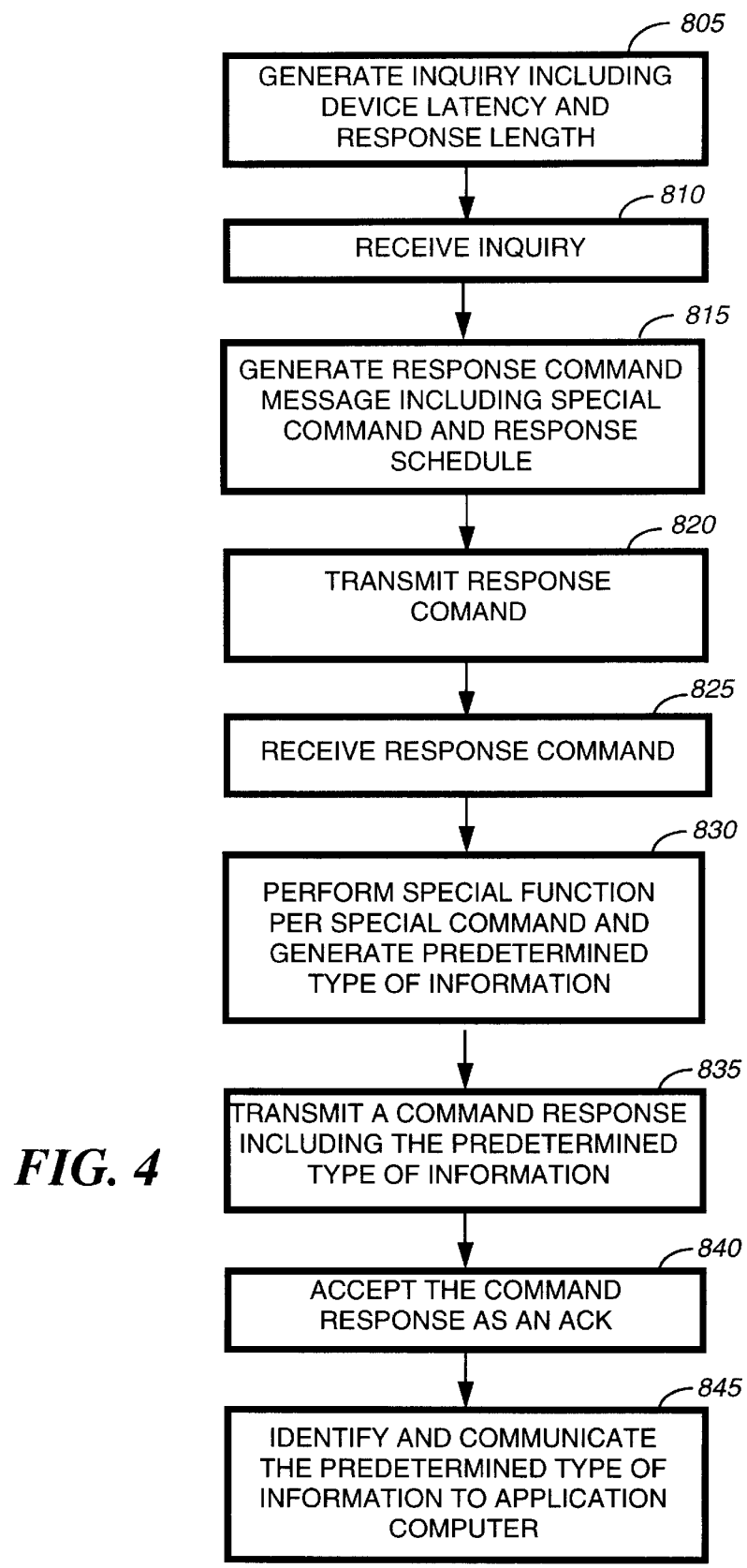
FIG. 4 is a flow chart of a method for coordinating inbound channel, in accordance with the preferred embodiment of the present invention.

Referring to FIGS. 3 and 4, a block diagram and a flow chart are shown illustrating the communication flow between the application computer 135, the home terminal 130, the system controller 102, and the selective call device 106 for an inquiry message transaction, in accordance with the preferred embodiment of the present invention. At step 805 (FIG. 4), an inquiry message 1 (FIG. 3) is generated at the application computer 135 (FIGS. 1 & 3) by an application such as a meter reading application. The inquiry message 1 is passed to the messaging switch home terminal 130, which receives it at step 810 (FIG. 4). The inquiry message 1 indicates a special function for the selective call device 106 to perform that results in the generation of a response by the selective call device 106 that includes a predetermined type of information known to the application computer 135. Included in the inquiry message 1 are an indication of a device latency and a length of the predetermined type of information. The device latency is an expected time required for the selective call device to calculate, acquire, and/or prepare the predetermined type of information. The response length is an amount of the predetermined type of information, preferably in bits, that is included in the demand response, and is alternatively described as the response length. The device latency can be in the form of milliseconds or some other convenient measure.

The home terminal 130 processes the inquiry message 1 to determine the selective call address from the landline address and generates a special command including the selective call address that will command the selective call device 106 to perform the special function. The home terminal 130 encodes the device latency and response length into a format useful for the system controller 102. The home terminal 130 then determines the transmission data speed capability of the selective call device 106 from the subscriber database and sends the special command, device latency, response length, and data speed capability 2 (FIG. 3) to the system controller 102.

The system controller 102 processes the device latency, response length, and data speed capability to determine a response schedule, that is, an inbound channel, a data speed, and a set of inbound channel time slots that are to be used by the selective call device 106 for transmitting the demand response. The system controller 102 encodes a response command message 3 (FIG. 3) at step 815 (FIG. 4) that includes both the special command and the response schedule, and transmits an outbound message at step 820 (FIG. 4) that includes the response command message 3 via the transmitter 103 to the selective call device 106.

Upon receipt of the response command message 3 at step 825 (FIG. 4), the selective call device 106 proceeds to perform the specified function as required by the response command message 3. When the selective call device 106 finishes performing the specified function, it generates the demand response at step 830 (FIG. 4), including the predetermined type of information, and waits for a beginning slot time as indicated by the response schedule. When the beginning slot time arrives, the selective call device 106 transmits the demand response 4 (FIG. 3) at step 835 (FIG. 4) according to the response schedule, which schedule preferably identifies a consecutive sequence of slot times for the demand response 4, but which alternatively can be more than one such consecutive sequence (particularly when the predetermined type of information is lengthy).

The demand response 4 is received by a receiver of a transmitter/receiver 103 that forwards it to the system controller 102. The system controller 102 determines from parameters unique to the demand response 4 that it is in response to the response command message 3. The unique parameters preferably consist of the channel and time slots in which the response is received and the selective address of the selective call device 106 that is included in the demand response 4, but alternatively could be, for example, the channel and time slots in which the response is received and a first message number that is included in the response command message 3, or could be simply the channel and time in which the demand response is received (with somewhat higher probability of falsing that the other methods described). Upon determining that the demand response 4 is in response to the response command message 3, the system controller 102 determines that the response command message 3 has been acknowledged by the selective call device 106 at step 840 (FIG. 4), and dequeues the response command message 3 from the outbound message memory 208. The system controller 102, further in response to this determination, communicates the predetermined type of information 5 (FIG. 3) included in the demand response 4 to the home terminal 130, along with the selective call address of the selective call device, and/or with a second message number that had been included in the inquiry message 1. At step 845 (FIG. 4), the home terminal 130 then communicates the predetermined type of information 6 (FIG. 3) determined by the selective call device 106 back to the application computer 135, identifying the predetermined type of information 6 as a response to the inquiry message 1 by attaching the predetermined type of information 6 to the inquiry message 1, or by use of the selective call address and/or a message number.

Figure 5:
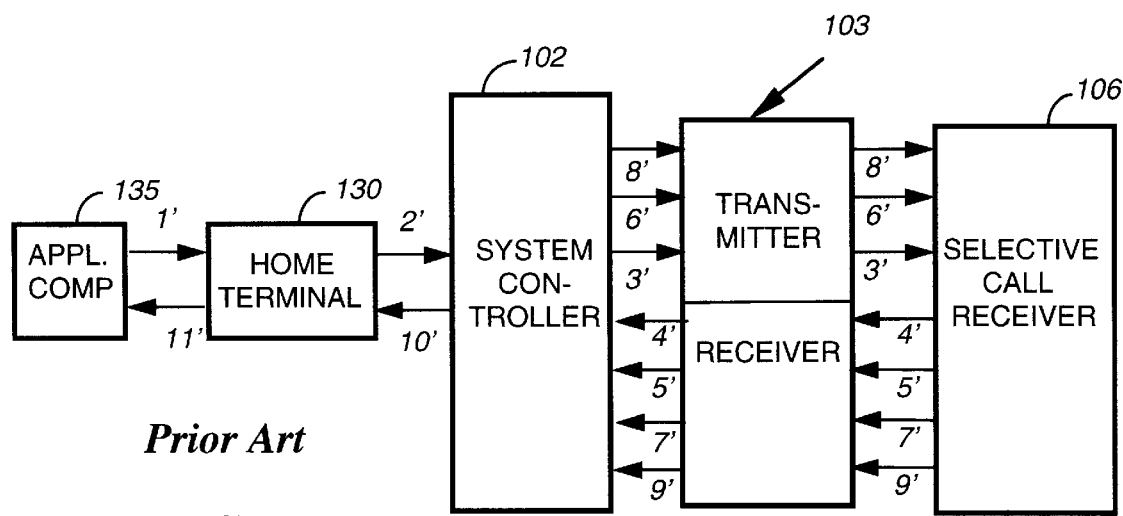
FIG. 5 is a block diagram illustrating the communication flow between an application computer, a messaging switch home terminal, a system controller, and a selective call device, in accordance with a prior art communication system.

The radio communication system 100, by providing for the return of the predetermined type of information and an acknowledgment in a single message, requires only two "over the air" (radio transmitted) messages. In prior art communication systems, information messages (not acknowledgments) from a selective call device 106 are typically generated only after the selective call device 106 communicates the length of the information message to the infrastructure of the communication system in an ALOHA message, and therefore more messages are needed to effect the communication than with the present invention. This is illustrated in FIG. 5, which shows: the inquiry message 1' from the application computer; a special command 2' generated by the home terminal 130; an outbound message 3' including the special command; an ACK 4' to the outbound message 3'; an unsolicited message 5' generated by the selective call device 106 (to identify the length of the response that will include the predetermined information), after it has generated the predetermined type of information; a response scheduling message 6' from the infrastructure to schedule the response; a scheduled response 7' from the selective call device 106 including the predetermined type of information; an ACK 8' to the scheduled response; an ACK to the ACK 9'; a response 10' from the controller to the home terminal 130; and the response to the inquiry 11'. Thus, in prior art system, many more over the air messages (3' to 9') are generated and one of them (5') is an ALHOA message. The present invention therefore improves throughput by eliminating the additional messages (including acknowledgments) and avoiding ALOHA messages. The present invention therefore substantially improves throughput over prior art radio communication systems.

It will be appreciated that the inquiry has been described heretofore as being generated in an external device, the application computer 135, but that in some systems, such as a dedicated system for special purpose selective call devices of one type only, the inquiries could alternatively be generated within the infrastructure 150 by the home terminal 130.

Figure 6:
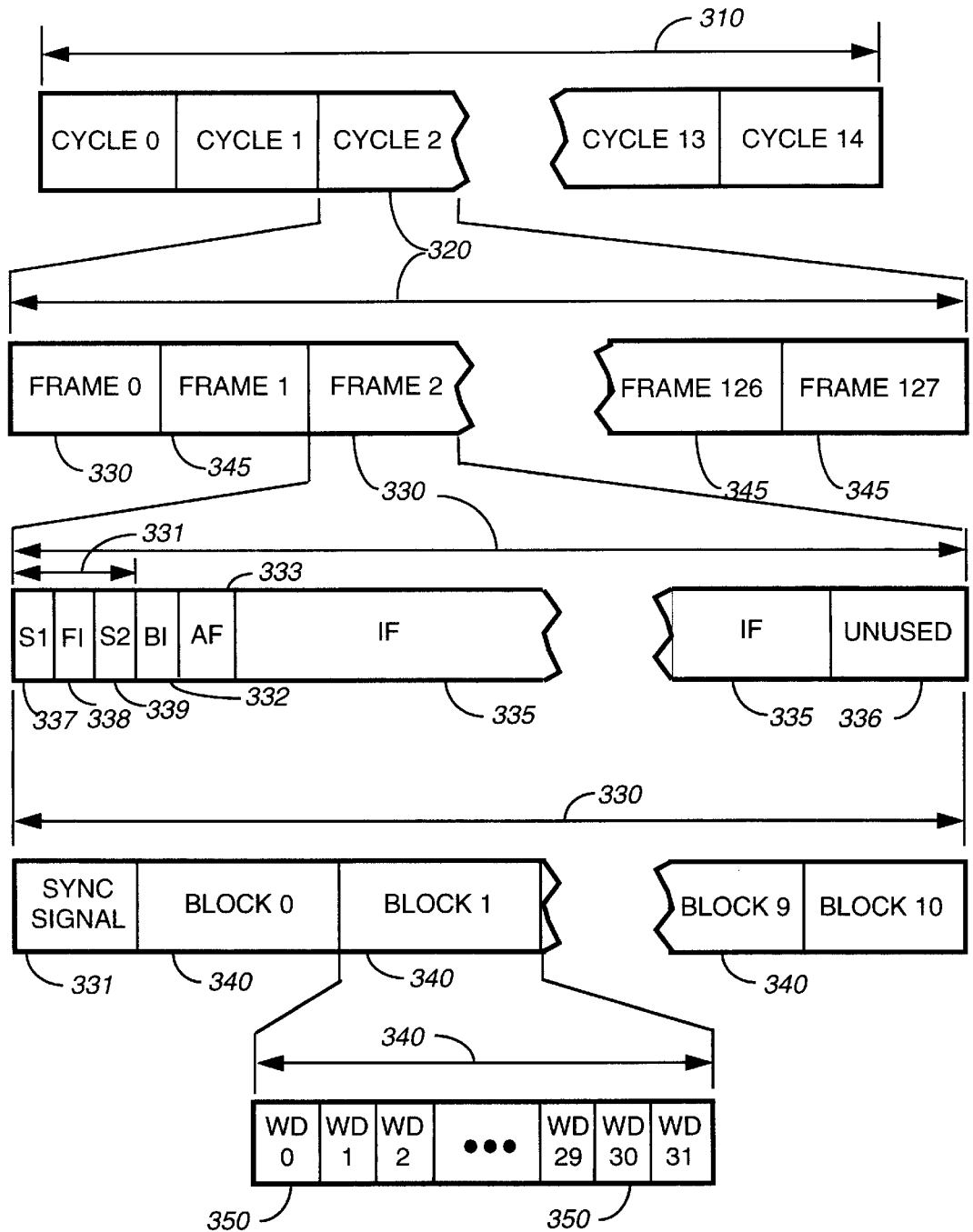
FIG. 6 is a timing diagram illustrating features of the transmission format of an outbound signal, in accordance with the preferred embodiment of the present invention.

Referring to FIG. 6 a timing diagram which illustrates features of the transmission format of the FLEX™ outbound signaling protocol utilized by the communication system 100 of FIG. 1, and which includes details of a control frame 330 in accordance with the preferred embodiment of the present invention. Control frames 330 are also classified as digital frames 330. The outbound signaling protocol is subdivided into protocol divisions, which are an hour 310, a cycle 320, a frame 330, 345, a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames including control frames 330 and analog frames 345 are transmitted in each of the cycles 320. Normally, all one-hundred-twenty-eight frames are transmitted. One synchronization signal 331 lasting one-hundred-fifteen milliseconds and 11 one-hundred-sixty millisecond uniquely identified blocks 340 are transmitted in each of the control frames 330. The synchronization signal 331 includes a first sync portion 337, a frame information word 338, and a second sync portion 339. The frame information word 338 includes 21 information bits and 11 parity bits. A bit rate of 1600 bits-per-second (BPS), 3200 BPS, or 6400 BPS is usable during the blocks of each control frame 330. The bit rate of the blocks 340 of each control frame 330 is communicated to the selective call devices 106 during the synchronization signal 331. When the bit rate is 1600 BPS, 8 thirty-two bit uniquely identified words 350 are transmitted in each block 340. For bit rates of 3200 BPS or 6400 BPS, 16 uniquely identified words or 32 uniquely identified words, respectively, each having 32 uniquely identified bits, are included in each block 340. In each word, at least 11 bits are used for error detection and correction, and 21 bits or less are used for information, in a manner well known to one of ordinary skill in the art. In some words, 15 bits are used for error detection and correction, and 17 bits are used for information, in a manner well known to one of ordinary skill in the art. The bits and words 350 in each block 340 are transmitted in an interleaved fashion using techniques well known to one of ordinary skill in the art to improve the burst error correction capability of the protocol.

Information is included in each control frame 330 in information fields, comprising system information in the frame information word 338 and a block information field (BI) 332, one or more selective call addresses in an address field (AF) 333, one or more of a set of vector packets, short message packets, and long messages in the information field (IF) 335, and an unused field 336 having no useful information therein. One aspect of system information included in the frame information word 338 is the frame number and the cycle number. The cycle number is a number from zero-to-15 which identifies each cycle 320. The frame number is a number from zero-to-one-hundred-twenty-seven which identifies each frame 330 of a cycle 320. The block information field 332 includes information which all active (i.e., not in a battery savings mode) selective call devices 106 decode during the control frame 330. This is called global information. Each vector packet and short message packet in the information field 335 of a frame 330 corresponds to at least one of the addresses in the address field 333 of the same frame 330. Each long message in the information field 335 corresponds to at least one vector packet in the information field 335 of at least one or more frames 330. The boundaries of the fields 332, 333, 335, 336 are defined by the words 350, not by the blocks 340, and the length of the fields 332, 333, 335, 336 are variable, depending on factors such as the type and amount of system information included in the block information field 332, the type of addresses used, and the amount of information in each message. Thus, the length of each of the fields 332, 333, 335, 336 can be shorter or longer than a block 340. The unused field 336 can be zero length when the total of the lengths of the other fields 332, 333, 335 equals eleven blocks 340. All vector packets and short messages intended for a particular selective call device 106 which has been activated for standard service are preferably scheduled for transmission in a predetermined one of the frames 330 of each cycle 320, so as to allow the particular selective call device 106 to go into a low power (non-receive) mode during other frames when short messages and vectors are not included for the particular selective call device 106. The block information field 332 in frame zero includes the following real time information: year, month, date, hour, minute, and one-eighth minute.

The vectors contain information which specifies the starting word of a long message in terms of the protocol divisions described above, and additionally, radio channel information such as radio channel frequency, subchannel offset from the radio channel frequency. The starting position and length of a long message, a short message, or a vector packet define the protocol position of the long message, short message, or vector packet.

When a selective call device 106 detects its address within a frame 330, the selective call device 106 processes the associated vector packet or short message packet within the frame 330. When a selective call device 106 decodes a vector packet in a frame 330 which corresponds with its selective call address, the selective call device 106 is directed to receive and decode a long message or an analog message in either the same frame 330, or another control frame 330 or an analog frame 345. In accordance with the preferred embodiment of the present invention, the vector includes the response schedule for a response to the message, which has been scheduled taking into account the latency of the device, and which is sent in lieu of an ACK which typically could have been generated more quickly if the selective call device were not determining the predetermined type of information that is to be included in the response. It will be appreciated that, in other types of synchronous protocols, the response schedule could alternatively be included within the long message. For the purposes of this description, the response schedule is included "in the message" whether it is included in a FLEX™ vector or long message, or the equivalent portions of other synchronous protocols.

Figure 7:
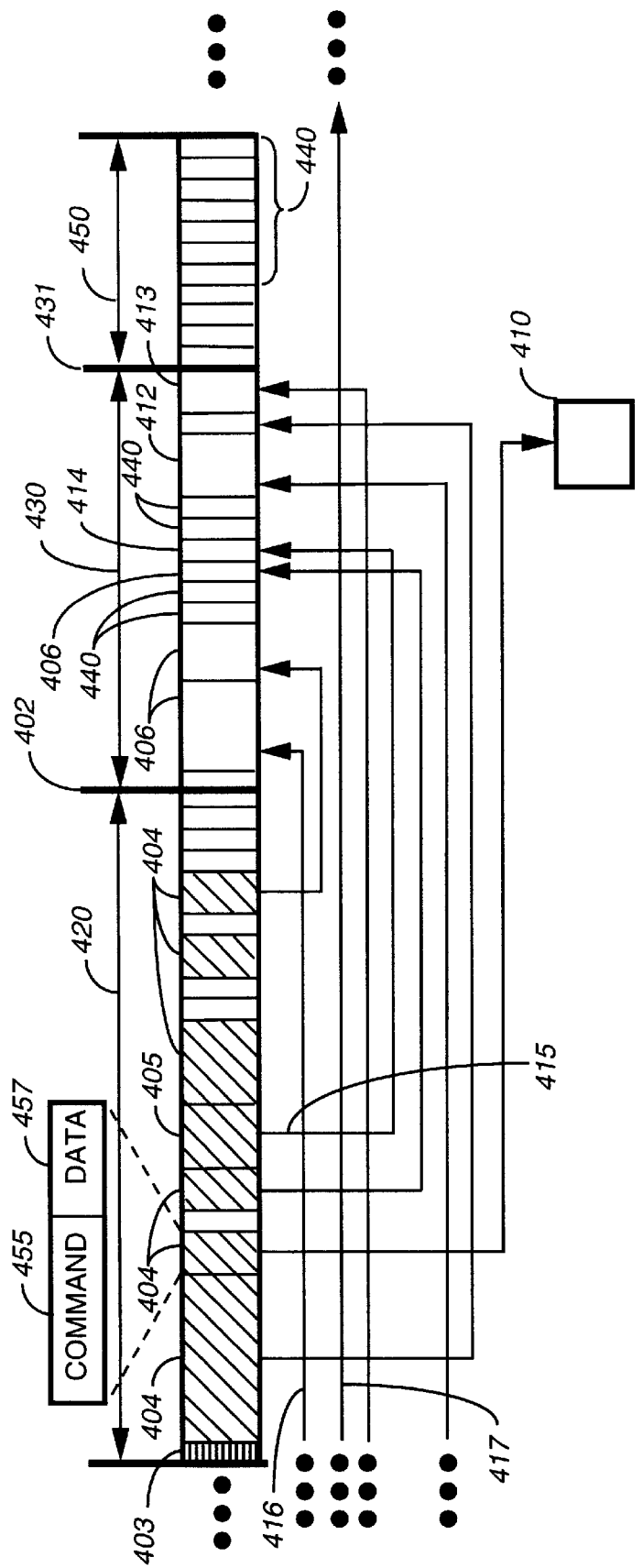
FIG. 7 is a timing diagram of outbound and inbound channels radio signals, in accordance with the preferred embodiment of the present invention.

Referring to FIG. 7, a timing diagram shows outbound and inbound channel radio signals for the communication system 100 in accordance with the preferred embodiment of the present invention. The outbound channel radio signal is transmitted during an outbound portion 420 of a control frame 330, and the inbound channel radio signals are transmitted during an inbound portion of the control frame 330, and are time division duplexed on the same radio carrier frequency. The outbound channel radio signal is generated and transmitted using the protocol described with reference to FIG. 6. The inbound channel radio signal is generated and transmitted using a conventional digital protocol having a synchronization portion and information words which are error protected. The inbound channel radio signal is transmitted beginning at a time slot 440 boundary. The control frame 330 shown in FIG. 6 is preceded and succeeded by control frames 330 and analog frames 345 (not shown), the order of which is determined by the type of messages generated for transmission from the transmitter/receivers

103. The inbound portion of the control frame 330 comprises a scheduled portion 430 and an ALOHA portion 450. When a selective call device 106 transmits an inbound message, the message is transmitted beginning at one of a predetermined number of periodic time slots 440 defined during each frame 330, 345 of the outbound signaling protocol.

During the outbound portion 420, an outbound channel radio signal is transmitted from the transmitter/receiver 103 to one or more of the selective call devices 106. The synchronization signal 331 (FIG. 6), block information field 332 (FIG. 6), address field 333 (FIG. 6) are shown as a segment 403 (FIG. 7) at the beginning of the outbound portion 420 of the control frame 330. Pluralities of outbound messages 404, 405 are transmitted within the outbound portion 420 of the control frame 330. The outbound portion 420 starts at the beginning of the control frame 330 and ends at an outbound/inbound boundary 402. The scheduled portion 430 is at a position in the control frame 330, which starts at the outbound/inbound boundary 402 and ends at a scheduled/ALOHA boundary 431. An outbound/inbound identifier which is transmitted in a block information field 332 of a control frame 330 identifies the position of the outbound/inbound boundary 402 relative to the beginning of the control frame 330 as a number of the time slots 440. The ALOHA portion 450 is at a position in the control frame 330 which starts at the scheduled/ALOHA boundary 431 and ends at the beginning of the next frame 330, 345. A protocol separation identifier which is transmitted in a block information field 332 of a control frame 330 identifies the position of the scheduled/ALOHA boundary 431 relative to the outbound/inbound boundary 402 of the control frame 330 as a number of the time slots 440. A plurality of scheduled responses 406, 410, 412, 413, 414 are transmitted as data units, each data unit extending over one or more time slots 440. For example, scheduled response 410 is four time slots 440, scheduled response 412 is five time slots 440, and scheduled response 413 is two time slots 440. Each of the plurality of scheduled responses 406, 410, 412, 413, 414 is a radio signal transmitted from one of the selective call devices 106 in response to a command 455 (e.g., the special command described above with reference to FIG. 3) that is completed in one of the outbound messages 404, 405. Scheduled response 410 is transmitted by one of the selective call devices 106 simultaneously with portions of scheduled responses 412 and 413, which are transmitted by other selective call devices 106. Scheduled response 410 is an example of a scheduled response that overlaps, in time, other scheduled responses 412, 413. A scheduled response overlap condition will occur, for example, when the system controller 102 schedules different selective call devices 106 to transmit scheduled responses, of which at least some parts are expected to be received at the same time by receivers in different geographically separated transmitter/receivers 103.

The start time of each outbound message 404 is defined as a frame number, block number, and word number. A command 455 is included in one or more of the outbound messages 404, identifying one of the selective call devices 106 by a selective call address of the identified selective call device 106, as well as a scheduled response time at which the identified selective call device 106 transmits a scheduled response in an inbound channel radio signal, the scheduled response comprising a data unit. The command 455 includes a designated length of the data unit. The outbound messages 404 also may include data 457, such as an alphanumeric information message. The start time of each scheduled response 406, 410, 412, 413, 414 is defined relative to the outbound/inbound boundary 402.

Synchronization and timing information required by the selective call devices in the communication system 100 for both receiving during the outbound portion of the control frame 330 and transmitting during the inbound portion of the control frame 330 is determined from the segment 403 and the outbound messages 404. When a selective call device 106 receives the outbound radio signal, the selective call device 106 processes the outbound message 404 included in the outbound radio signal when the outbound message 404 includes the selective call address of the selective call device, thus identifying the selective call device 106 for processing the outbound message 404. When a command 455 is received within the outbound message 404, or in a plurality of outbound messages and processed by the selective call device 106, the selective call device 106 then transmits one of the scheduled responses 406, 410, 412, 413, 414 with the designated data unit length and at the scheduled response time commanded by the system controller 102 in the command 455. Correspondence between the commands 455 received by identified selective call devices in the outbound messages 404 and the scheduled responses 406, 410, 412, 413, 414 from the identified selective call devices is indicated in FIG. 7 by arrowed lines from outbound messages 404, 405 to the scheduled responses 406, 410, 412, 413, 414, of which an example is line 415, which connects from a command 455 completed in outbound message 405 to scheduled response 414. Another example is line 416, which connects from a command 455, not shown in FIG. 6, that is completed in an earlier control frame 330 than the control frame 330 shown in FIG. 6, to one of the scheduled responses 406. Another example is line 417 which indicates connection from a command 455, not shown in FIG. 6, that is completed in an earlier outbound control frame than the outbound control frame 330 shown in FIG. 6, to a scheduled response that is in a later control frame 330 than those shown in FIG. 6.

While outbound and inbound messages are sent on one radio channel at different times in the type of communication system described above with reference to FIG. 6, it will be appreciated that in multichannel radio communication systems, the inbound messages are typically sent in a scheduled portion 430 and an ALOHA portion 450, which together occupy a complete control frame 330.

Figure 8:
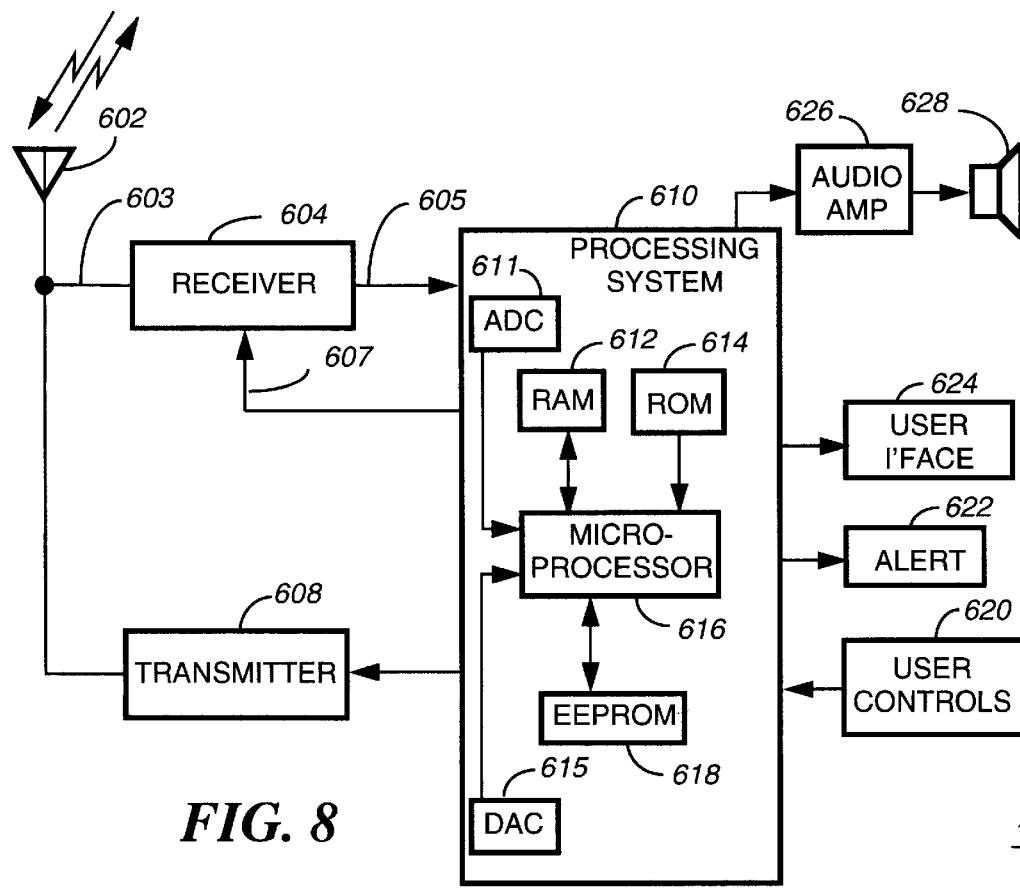
FIG. 8 is an electrical block diagram of the selective call device, in accordance with the preferred embodiment of the present invention.

Referring to FIG. 8, an electrical block diagram of a multichannel selective call device 106 is shown in accordance with the preferred embodiment of the present invention. The selective call device 106 includes an antenna 602 for intercepting and transmitting radio signals. The antenna 602 is coupled to a conventional receiver 604 wherein the intercepted signal 603 is received. Receiving includes filtering to remove undesirable energy at off channel frequencies, amplification of the filtered signal, frequency conversion of the signal 603, and demodulation of the signal 603 in a conventional manner. The receiver 604 thereby generates a demodulated signal 605 that is coupled to a processing system 610. The receiver 604 also has a power control input 607 coupled to the processing system 610. The processing system 610 is coupled to a display 624, an alert 622, an audio amplifier 626, a transmitter 608, and a special function device 620. The transmitter 608 is coupled to the processing system 610 by a modulation signal and a channel control signal, and is also coupled to the antenna 602. The audio amplifier 626 is coupled to a speaker 628. The processing system 610 comprises a microprocessor 616 which is coupled to an analog to digital converter (ADC) 611, a digital to analog converter (DAC) 615, a random access memory (RAM) 612, a read only memory (ROM)

614, and an electrically erasable programmable read only memory (EEPROM) 618. The demodulated signal is coupled to the ADC 611. The processing system 610 is coupled to the transmitter by the DAC 615. The ADC 611 converts the demodulated signal from an analog signal to a digital signal in a conventional manner, for processing by the processing system 610. When the demodulation signal is an analog signal, the analog signal is converted to a digital signal using an analog to digital conversion technique such as adaptive differential pulse code modulation (ADPCM). A bit recovery function converts digital signal to binary data in a conventional manner. A synchronization function acquires and maintains bit, word, block, frame, and cycle synchronization with the outbound signaling protocol from the synchronization signal 331 (FIG. 6) of the frames 330, 345 (FIG. 6) in manner well known to one of ordinary skill in the art. A block word decoder function decodes the words 350 (FIG. 6) included in the blocks 340 of the outbound signaling protocol in a manner well known to one of ordinary skill in the art. A message processor function decodes outbound words and processes an outbound message when an address received in the address field 333 (FIG. 6) of the outbound signaling protocol matches an embedded address stored in the EEPROM 618, or when a global indication is received, in a manner well known to one of ordinary skill in the art for a selective call device 106. An outbound message that has been determined to be for the selective call device 106 by the address matching or global indicator is processed by the message processor function according to the contents of the outbound message. An alert signal is typically generated when an outbound message includes user information. The alert signal is coupled to the alert device 622, which is typically one of an audible and silent alerting device.

When the outbound message includes alphanumeric or graphic information, the information is displayed on the display 624 in a conventional manner by a display function. Inbound messages are generated in digital form by an inbound message function. When the outbound message is a response command message that includes the special function, a special function device 620 acquires, reads, or measures, etc., the predetermined type of information. A demand response is generated and encoded using the protocol described with reference to FIG. 7 for the reverse (inbound) channel and coupled to the DAC 615, wherein it is converted to an analog signal which modulates the transmitter 608, in a manner well known to one of ordinary skill in the art. The conventional transmitter 608 generates an RF signal, which is transmitted by the antenna 602. Uniquely, however, the demand response is generated in lieu of an acknowledge message.

The RAM 612, the EEPROM 618, the ADC 611 and the DAC 615 are preferably conventional parts. The ROM 614 is a conventional part having a unique set of masked program instructions, a portion of which perform the unique functions which are described herein. Preferably, the microprocessor 616 is similar to the DSP56100 series digital signal processor (DSP) manufactured by Motorola, Inc. It will be appreciated that other similar processors can be utilized for the microprocessor 616, and that additional processors of the same or alternate type can be added as required to handle the processing requirements of the processing system 610. It will be appreciated that other types of memory, e.g., ultraviolet erasable programmable read only memory (UVEPROM) or flash ROM, can be alternatively utilized for the ROM 614, as well as the RAM 612. It will be further appreciated that the RAM 612, the EEPROM 618, the ADC 611, the DAC 615, and the ROM 614, singly or in combination, can be integrated as a contiguous portion of the microprocessor 616.

The processing system 610 performs functions including at least portions of the bit recovery, synchronization, block word decoding, message processing, display, message handling, and inbound message generation described above. The conventional and unique functions are executed by the microprocessor 616 which is a conventional microprocessor 616 controlled by a set of program codes stored in the mass storage memory 214 (FIG. 2). The unique functions are controlled by a unique set of program codes generated using conventional programming tools. The microprocessor 616 is coupled to a special function device 620 according to the preferred embodiment which measures, reads or acquires the information or data which is to be processed by the processing system 610 and transmitted to the home terminal 130.

It will be appreciated that the processing system can be alternatively implemented without the microprocessor 616, by implementing the conventional and unique functions described herein with a combination of conventionally available off the shelf integrated circuits such as CMOS shift registers, clocks, gates, counters, DAC, ADC, and RAM, and that further, some or all of the conventionally available off the shelf integrated circuits used to implement the processing system can be alternatively implemented in an application specific integrated circuit. It will be further appreciated that the microprocessor 616 can alternatively be a conventional microprocessor, such as a microprocessor in the family of 68HC11 microprocessors manufactured by Motorola, Inc., of Schaumburg, Ill.

Furthermore, when the communication system is a radio communication system, it need not be a radio communication system that uses a protocol of the FLEX™ family, such as the ReFLEX™ or InFLEXion™ protocol. Other communication system protocols such as the General Packet Radio System overlay proposed for use in the well-known Global System for Mobile communications radio system could be modified to provide the functions described herein.

By now it will be appreciated that the use of a response command message that includes the special function and the response schedule reduces the number of message transmissions required and the latency involved to acquire a predetermined type of information from a selective call device 106, by eliminating multiple outbound messages, unscheduled inbound messages, and acknowledgments, and thereby improving message throughput.

I claim:

1. A method used in an infrastructure of a two-way radio synchronous communication system to efficiently acquire a predetermined type of information from a selective call device, the method comprising the steps of:

receiving an inquiry to acquire the predetermined type of information from the selective call device, the inquiry including a device latency needed for the selective call device to generate the predetermined type of information, and including a response length that identifies an amount of the predetermined type of information;

generating a response schedule from the device latency and the response length;

generating a response command message that includes a command to the selective call device to generate the predetermined type of information and includes the response schedule;

transmitting the response command message; and receiving a demand response that includes the predetermined type of information, and in accordance with the response schedule.

2. The method according to claim 1, further comprising the step of accepting the demand response as an acknowledgment to the response command message.

3. The method according to claim 1, further comprising the step of identifying the predetermined type of information as a response to the inquiry.

4. The method according to claim 1, wherein the response schedule comprises an identified sequence of time slots of a FLEX frame.

5. The method according to claim 1, wherein the device latency is an identified plurality of time slots of a FLEX frame.

6. The method according to claim 1, wherein the inquiry is received from an external device.

7. A method used in a two-way radio synchronous communication system to efficiently acquire a predetermined type of information from a selective call device, the method comprising the steps of:

in an infrastructure of the two-way radio synchronous communication system,
receiving an inquiry to acquire the predetermined type of information from the selective call device, the inquiry including a device latency needed for the selective call device to generate the predetermined type of information, and including a response length that identifies an amount of the predetermined type of information;
generating a response schedule from the device latency and the response length;
generating a response command message that includes a command to the selective call device to generate the predetermined type of information and includes the response schedule; and
transmitting the response command message;

in the selective call device,
receiving the response command message;
generating a demand response including the predetermined type of information in response to the command; and
transmitting the demand response according to the response schedule; and in the infrastructure,
receiving the demand response according to the response schedule.

8. The method according to claim 7, further comprising the step of accepting the demand response as an acknowledgment to the response command message.

9. The method according to claim 7, further comprising the steps of:

Identifying the predetermined type of information as a response to the inquiry.

10. The method according to claim 7, wherein the response schedule comprises an identified sequence of time slots of a FLEX frame.

11. The method according to claim 7, wherein the latency is an identified plurality of time slots of a FLEX frame.

12. The method according to claim 7, wherein the inquiry is received from an external device.

13. The method according to claim 7, wherein the inquiry is generated within the infrastructure.

* * * * *